United States Patent Office 2,916,777
Patented Dec. 15, 1959

2,916,777
IMPROVED METHOD OF EXTRUDING A TOBACCO SMOKE FILTER

Amos W. Crane and Henry W. Collins, Kingsport, Tenn., assignors to Eastman Kodak Company, Rochester, N.Y., a corporation of New Jersey No Drawing. Application September 16, 1954
Serial No. 456,603

1 Claim. (Cl. 18—55)

This invention relates to the manufacture of a new and improved filter for the removal of nicotine tars and other undesirable components from tobacco smoke.

A wide variety of fibrous and porous materials have been suggested for the manufacture of tobacco smoke filters. Cotton and similar materials have been proposed, but they have the disadvantages of excessive moisture pick-up from the smoke stream and result in unsatisfactory taste or excessive heat and smoke or gas dryness. Other disadvantages of the textile and fibrous materials are the difficulties in preparing a uniform filter which will not allow the smoke to channel.

We have found that these disadvantages are overcome by providing filters comprising a mixture of cellulose acetate and fibrous cellulose or a mixture of a soluble cellulose acetate and an insoluble cellulose compound, that is, a cellulose compound insoluble in the usual solvents for cellulose esters, in fibrous form. These materials considerably reduce the moisture pick-up by the filter. An object of the invention is the manufacture of such filters.

According to the invention, the filter is preferably formed by prewetting the insoluble component (cellulose or cellulose compound) with an inert liquid (for example, acetic acid, aqueous acetic acid, isopropyl acetate, hexane, Stoddard solvent, acetone, or aqueous acetone). The prewet or dry insoluble component is then intimately mixed with a solution of cellulose acetate. Water or other non-solvent diluent is then added to the system to adjust the solids content and to approach the gel or precipitation point. The adjusted mixture is extruded through a pipe or orifice approximately the diameter of the cigarette or other smoking appliance with which it is to be used, into a non-solvent or water precipitating bath. The precipitation of the cellulose acetate dope forms a skin on the outside of the resulting rod and precipitates as very random short fibers on and around the insoluble component. The resulting filter can be made very dense or very open by altering the dissolved solids in the dope, or the amount of insoluble component. More solids give a more dense filter, and more of the insoluble component yields a more open filter.

Another factor which operates to affect the density of the filter is the degree of hydrolysis of the dissolved cellulose ester. Esters having increased hydrolysis can tolerate more water diluent in preparation for final extrusion; for this reason they make possible a more open filter.

Example 1

Two hundred (200) grams of acetic acid dope containing 13% solids of cellulose acetate at 39% acetyl were thoroughly mixed with 11 grams of acetylation grade cotton linters which had been prewet in 60% acetic acid and water. This mixture was then diluted with one-half volume of water and extruded through a glass tube into a water bath. The resulting rod was thoroughly washed and dried and sections ½ inch long attached to the ends of cigarettes. Other samples were cut to fit inside a pipe filter unit. In both applications they provide effective filtering.

Example 2

Two hundred (200) grams of acetic acid dope containing 13% solids of cellulose acetate at 32% acetyl were thoroughly mixed with 11 grams of acetylation grade cellulose pulp which had been prewet in 60% acetic acid and water. This mixture was then diluted with 10% acid until the gel or precipitation point was nearly reached; this required approximately three-quarters of a volume of 10% acid. The resulting mixture was extruded through an orifice into a water bath to form a rod which was then washed, dried, cut into sections 10 mm. long, and attached to the ends of cigarettes to provide a filtering means for cigarette smoke.

Example 3

One hundred (100) grams of cellulose acetate (38% acetyl) were dissolved in 500 cc. of acetone and 30 grams of opened cotton linters were stirred into this solution. Water was then added in quantity sufficient to bring this solution near to the gel or precipitation point. This mixture was extruded through an orifice into a water bath to form a rod which, after washing, drying, and cutting, could serve as a filter if appropriately attached to the end of a cigarette.

While we prefer to employ cellulose esters dissolved in the original acylating acids as a starting solution or dope for the practice of our process, solutions of cellulose acetate in other appropriate solvents may be employed as illustrated above.

Cellulose acetate of varying acetyl values can be used, preferably in the range of 32 to 38% acetyl. Mixed lower aliphatic acid esters of cellulose can also be used, for example, cellulose acetate propionates. Other forms of cellulose which can be used in place of cotton linters include pulp cellulose, short staple cellulose, and other insoluble cellulose compounds. Various precipitating baths known in the art for use with cellulose acetate can be used.

The linters may be "opened" before incorporation into the dope, to break up small lumps of matted fibers by blowing with compressed air, for example, in a circular container, using a tangential air blast, or in a pipe through which the linters pass longitudinally and contact a tangential air stream.

We claim:

A method of manufacturing a filter body comprising mixing about 200 parts by weight of acetic acid dope containing about 13% solids of cellulose acetate of 32 to 39% acetyl with about 11 parts by weight of cotton linters which had been prewet in 60% aqueous acetic acid, adding about one-half volume of water, and extruding the mixture, through an orifice approximating in cross section that of a cigarette, into a water bath, and then washing and drying the resulting filter body.

References Cited in the file of this patent

UNITED STATES PATENTS

| | | |
|---|---|---|
| 729,680 | Schwartz | June 2, 1903 |
| 1,290,960 | Fox | Jan. 14, 1919 |
| 1,956,564 | Crane et al. | May 1, 1934 |
| 2,185,293 | Copeman | Jan. 2, 1940 |
| 2,228,383 | Berl | Jan. 14, 1941 |
| 2,242,372 | Schneider | May 20, 1941 |
| 2,265,436 | Loblein | Dec. 9, 1941 |
| 2,369,583 | Lucid | Feb. 13, 1945 |

FOREIGN PATENTS

| | | |
|---|---|---|
| 451,682 | Great Britain | Aug. 10, 1936 |
| 451,683 | Great Britain | Aug. 10, 1936 |
| 478,937 | Great Britain | Jan. 27, 1938 |
| 665,278 | Great Britain | Jan. 23, 1952 |